United States Patent
Hársy-Vadas

[11] 3,904,181
[45] Sept. 9, 1975

[54] FLUID TYPE ACCUMULATOR SPRING WITH EMERGENCY BACK-UP SPRING

[75] Inventor: Gábor Hársy-Vadas, Neuhausen, Switzerland

[73] Assignee: S I G Schwiezerische Industrie-Gesellschaft, Neuhausen, Switzerland

[22] Filed: Apr. 29, 1974

[21] Appl. No.: 465,218

[30] Foreign Application Priority Data
Feb. 28, 1974 Switzerland............... 002822/74

[52] U.S. Cl................. 267/35; 267/3; 267/65 B
[51] Int. Cl.² ................................ B60G 11/62
[58] Field of Search............. 267/35 V, 3 V, 65 V

[56] References Cited
UNITED STATES PATENTS

| | | |
|---|---|---|
| 2,930,607 | 3/1960 | Hutzenlaub ............... 267/35 |
| 3,160,407 | 12/1964 | Vaugoycau ............... 267/35 |
| 3,826,507 | 7/1974 | Brand et al. ............... 267/35 |

*Primary Examiner*—James B. Marbert
*Attorney, Agent, or Firm*—Lawrence Rosen; E. Janet Berry

[57] ABSTRACT

Accumulator or fluid spring or gas spring for use in supporting vehicles, e.g. railway cars, in combination with a back-up emergency spring: the accumulator includes a compressed gas filled bellows holding two plates apart; the back-up spring is a solid spring body that is prestressed; upon failure of pressure in the bellows, one of the plates presses against the already prestressed back-up spring and further stresses it, and the back-up spring takes over the support function.

24 Claims, 2 Drawing Figures

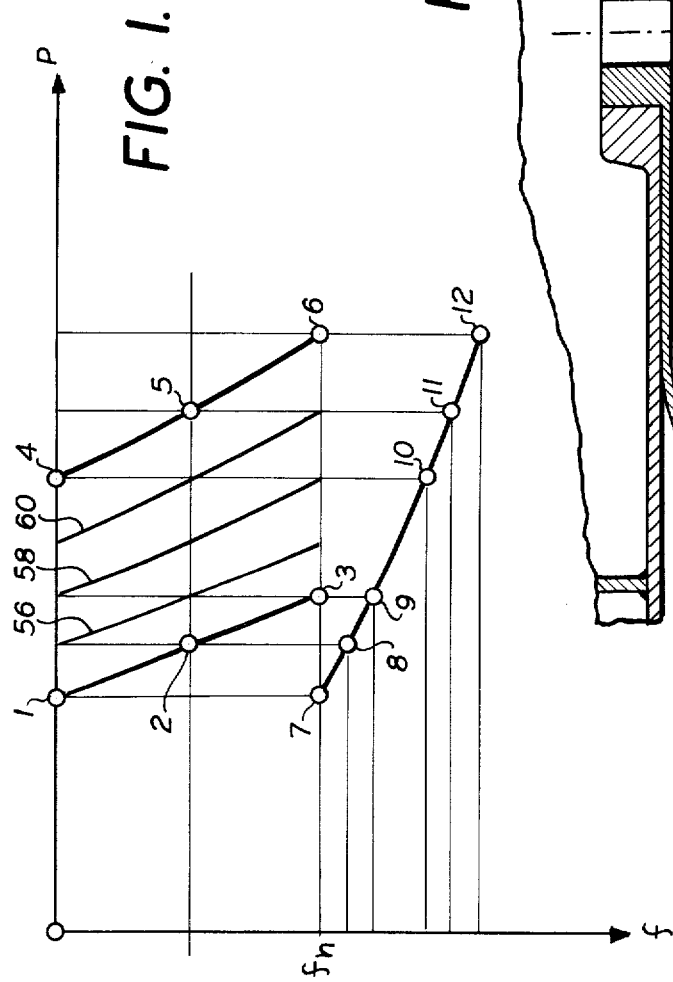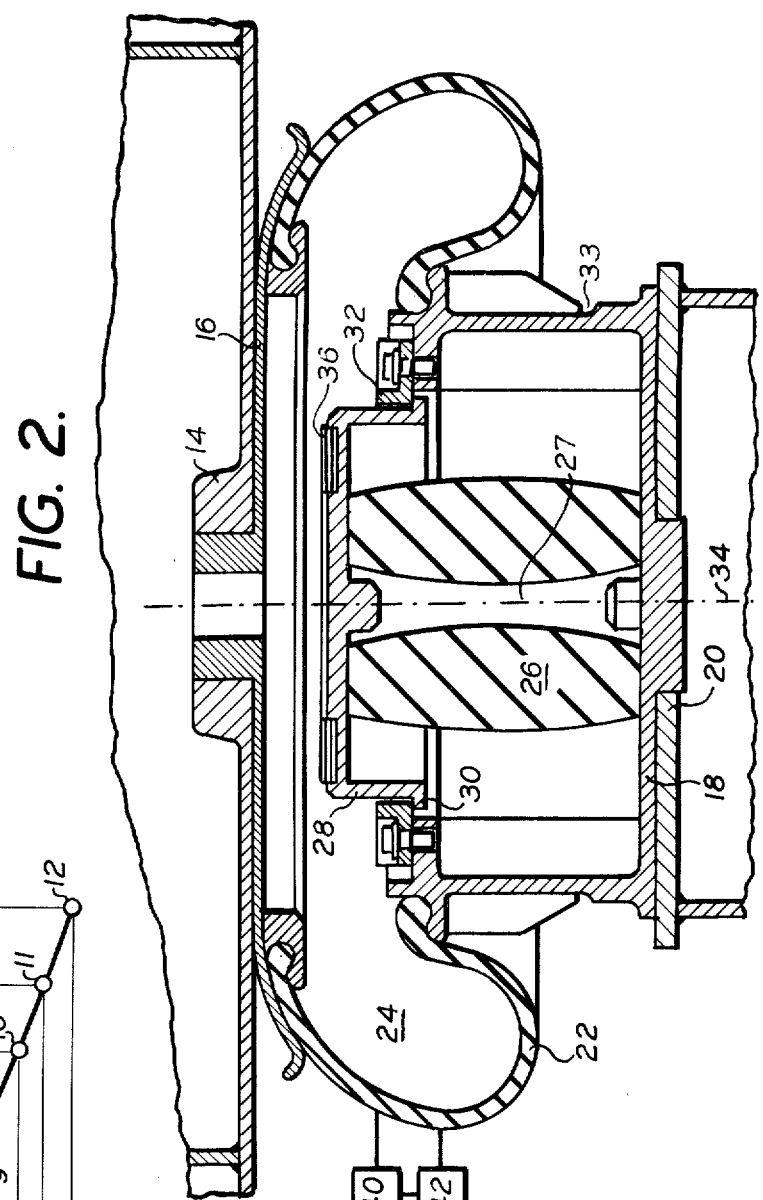

FLUID TYPE ACCUMULATOR SPRING WITH EMERGENCY BACK-UP SPRING

BACKGROUND OF THE INVENTION

The invention relates to an accumulator, or fluid spring or gas spring, and more particularly to an accumulator with an associated back-up or emergency spring which functions upon failure of the accumulator.

An accumulator comprises a chamber between two surfaces, which chamber is filled with a pressurized fluid, particularly a gas, whereby the pressurized fluid resiliently presses against the surfaces when the chamber is inflated. Fluid filled accumulators or gas springs are frequently used in vehicles, particularly railroad cars. The accumulators are interposed at some location between the wheels and the payload in the vehicle.

Where failure of an accumulator can cause a dangerous condition, it is necessary to provide an additional back-up or emergency spring to act in cooperation with the accumulator. Failure of the accumulator might occur if gas pressure fails, if the payload is excessive, if the gas pressure maintaining means fails, etc. A back-up spring ensures that some, although somewhat reduced, springness and support will be provided. The back-up spring may also be designed as a fluid filled accumulator or gas spring. But, to insure maximum reliability in unpredictable emergencies, the back-up spring should be of non-fluid material, and most preferably, it should be comprised of a solid, substantially undamageable, resilient deformable body.

The invention will be described in connection with vehicles in general and railroad cars in particular. It is adapted to other uses within the scope of the invention.

The forces acting upon the accumulator of a vehicle, particularly a railroad car, can be characterized as being of three types:

The first type are the static forces that are caused by the weight of the superstructure of the vehicle and by the payload carried in the vehicle. The static forces vary between the weight of the empty vehicle and the combined weight of the vehicle and the payload. The static forces change only as the payload changes when the vehicle stands still. These forces remain effectively constant during vehicle travel.

The second type of forces are the dynamic forces, which occur only upon movement of the vehicle. They occur in the form of rapid shocks and correspondingly rapid reliefs from the shocks, and they occur in both regular and irregular sequence and with varying frequencies and strengths. These forces are caused by the unavoidable inaccuracies, irregularities and gaps in the tracks and the wheels of the vehicle.

The third type of forces are the quasi-static forces. These also change during travel of the vehicle, but they involve changes that are much less rapid than the dynamic forces. The quasi-static forces are caused by changes taking place over long distances or by gradual changes in the track, due for example, to rail buckling, cross-overs, bends or curves in the track.

All three types of forces experienced by a vehicle must be taken into account in the design of an accumulator and the associated back-up spring. The travel stroke of the spring and the other spring characteristics are selected so that the three types of forces can be absorbed by the combined spring system.

Derailing safety plays an important role in railroad cars. In the relation between the horizontal guiding force exerted by the rail on the wheels and the instanteous wheel load on the rail, there is a risk that when the instanteous wheel load becomes too large with respect to the guiding force of the rail, the guided wheel of the car will override the rail and a derailment will occur. Accumulators and associated back-up springs used with railroad cars must take this problem into account.

Known combinations of an accumulator and a back-up spring have drawbacks, particularly if large demands are made on the derailing safety and riding comfort of a vehicle, such as a railroad car, over a wide speed range. For a gas accumulator to work independently of the respective back-up spring in normal operation, and for the back-up spring to respond safely in case of a failure of a gas accumulator and without any great loss of comfort, a very long travel stroke of the object being supported as it shifts from being supported by the gas accumulator to being supported by the back-up spring is necessary before the back-up spring takes over. However, the large stroke is disadvantageous because of the lack of available space for absorbing the stroke and because of the need to maintain the stability and, therefore, the minimal shifting of the railroad car or other vehicle being supported.

With respect to the application of forces to the spring and accumulator, the back-up spring is either in series with or in parallel with the accumulator. A parallel arrangement has the benefit that a predetermined length idle stroke can be provided before the back-up spring is contacted and caused to act.

BRIEF DESCRIPTION OF THE INVENTION

In the present invention, a fluid accumulator, particularly a gas accumulator or spring, operates in parallel with a back-up or emergency spring that is preferably made from a solid element. The back-up spring is always maintained in a prestressed condition. When it is operated upon failure of the gas accumulator, it is further stressed from its already prestressed condition. The back-up spring acts only after a predetermined idle stroke during stressing of the spring combination. The spring characteristic of the gas accumulator, the initial stressing of the back-up spring, the position of the back-up spring with respect to the gas accumulator and the length of the idle stroke of the gas accumulator can be tuned to the corresponding characteristics of the gas accumulator so that in normal operation, the gas accumulator acts to the exclusion of the back-up spring; and when the gas accumulator fails, it is the back-up spring that acts exclusively and takes over both of the support and suspension functions.

The back-up spring can be located either outside of or inside of the body of the accumulator. In a preferred embodiment, the back-up spring is installed coaxially with and inside the gas accumulator. The back-up spring has an operating surface, which serves to hold the back-up spring in its prestressed condition and which is contacted and pressed against by the object being supported after completion of the idle stroke. This operating surface can, at least in part, be a slide surface to absorb lateral shifting of the load as the load rests against the operating surface during travel of the vehicle.

It is the primary object of the present invention to provide a back-up means for use upon failure of a fluid or a gas accumulator or spring.

It is another object of the present invention to provide a back-up spring to substitute for an accumulator with minimal disruption of the support, the comfort and the safety of operation functions provided by the accumulator.

It is yet another object of the invention to minimize the necessary idle stroke of a fluid accumulator before its back-up spring takes over the support function.

It is another object of the present invention to prestress the back-up spring in order to enable its effective performance.

It is a further object of the invention to provide means for absorbing lateral movements of the object being supported when the back-up spring is operating.

These and other objects of the invention will become apparent from the following description of the accompanying drawings in which:

FIG. 1 is a load displacement vs. load force diagram showing the function characteristics of a gas accumulator and a back-up spring associated therewith.

FIG. 2 is a cross-sectional, elevational view through a gas accumulator back-up spring combination, having the characteristics depicted in FIG. 1.

DETAILED DESCRIPTION OF THE INVENTION

Turning to FIG. 2, the spring system shown there is designed for use in the suspension of a railroad box car. It is apparent that there are other uses of the illustrated spring system, at other locations in a railroad car, in other vehicles, and in stationary installations. In vehicles, the illustrated spring system can alternatively be installed in a similar manner between the frame or chassis of and the axle bearing of a truck or car or between the lower part of the superstructure of any vehicle and its axle.

In FIG. 2, there is a main spring or accumulator. Lower box car part 14 bears upon accumulator upper section or spring plate 16. Accumulator lower section or spring plate 18 bears upon the frame or the truck (not shown) of the railroad car (not shown). Plates 16, 18 are two spaced apart sections of the accumulator. Upper spring plate 16 is air tightly, resiliently connected with lower spring plate 18 by bellows 22, which is formed of flexible and perhaps elastic material. Cavity 24 in bellows 22 is pumped up with a compressed gas, usually air, by pump 40. The gas pressure in cavity 24 acts upon the faces of spring plates 16, 18 and transmits forces thereto elastically. Bellows 22 permits accumulator plates or sections 16, 18 to move toward and away from each other in the vertical direction of FIG. 2. Bellows 22 also permits relative sideways movement of the plates in the horizontal direction. The gas pressure in cavity 24 is controlled by conventional regulating system 42 so that the vertical position of box car part 14 is regulated to maintain a predetermined height level with different weight payloads in the box car.

Back-up or emergency spring 26 is installed inside of and has a commmon axis 34 with the accumulator. Both of the accumulator and the back-up spring are annularly shaped. Back-up spring 26 is designed as a solid body revolution and is made of a springy material, such as rubber. In the unstressed state, spring 26 is a resilient material, cylindrical body with a bore 27. Spring 26 rests on lower spring plate 18.

Spring 26 is prestressed from above by a back-up spring stressing means, shown as a downwardly facing, cup like stressing plate 28. Plate 28 has a peripheral retaining edge flange 30, which is pressed upwardly by spring 26 against ring or cam shaped stops 32. Stops 32 are joined to lower spring plate 18 by connections 33. Stops 32 prevent plate 28 from moving upwardly. Plate 28 can only move downwardly if bellows 22 fail to hold up plate 16. The space between upper spring plate 16 and back-up spring plate 28 permits an idle stroke for box car part 14 before back-up spring 26 is engaged and begins performing its support function. Back-up spring plate 28 is provided at its top side with a special insert, which forms a sliding surface 36 in order to reduce the friction and wear caused by relative lateral movements of plates 16, 18 when upper spring plate 16 is bearing upon stressing plate 28.

As any of the three types of forces upon surfaces 16, 18 increases, there is a relative downward movement of upper spring plate 16 toward lower plate 18 until plate 16 bears on back-up spring stressing plate 28. When this contact occurs, back-up spring 26 is stressed beyond its prestressed condition. As long as the gas filled accumulator operates properly, and the relative movement toward one another of plates 16, 18 does not exceed the permissible idle stroke, back-up spring 26 is not stressed.

In FIG. 1, the forces exerted on the accumulator and back-up spring are designated on the abscissa by P; and the displacement of the payload or the box car part 14 of FIG. 2 with respect to the stationary support or wheel or plate 18 are designated on the ordinate by F. The various operating states of the accumulator and back-up spring are now described, based upon the diagram in FIG. 1. With the box car carrying no payload and without any further dynamic or quasi-static influences, upper spring plate 16 assumes the position corresponding in FIG. 1 to point 2. If additional dynamic or quasi-static forces are applied to this basic load, upper spring plate 16 moves, in terms of displacement and the force exerted thereon, in range of the line 1–2–3 in FIG. 1 between the maximum positive and negative values of such movement. If the box car is loaded with a full, heavy payload, and the static force increases, the box car part and plate 16 are held at the same level as before by regulating means 42, which correspondingly increases the pressure in chamber 24. In this case, plate 16 assumes the position corresponding to point 5 in FIG. 1. If additional dynamic or quasi-static are applied at full payload, upper spring plate 16 moves, in terms of its displacement and the force exerted thereon, in the range of line 4–5–6 in FIG. 1 between the maximum positive and negative values of such movement. With various partial payloads generating static forces between points 2 and 5, and with anticipated dynamic and quasi-static forces applied thereto, upper spring plate 16 moves along the appropriate one of intermediate lines 56, 58, 60, et al. in FIG. 1.

If the gas accumulator fails, supporting gas pressure in chamber 24 drops to ambient pressure, and upper spring plate 16 bears on back-up spring plate 28, further stressing back-up spring 26. Because spring 26 is prestressed, it is not contracting from zero force when it is first contacted by spring plate 16. The permissible course of movement of back-up spring 26 can be selected so that the payload rides relatively softly on back-up spring 26, without the total height of the combined accumulator and back-up spring having to be made too great.

With no payload in the box car and with the gas accumulator not functioning and therefore with back-up spring 26 providing all of the support, plate 16 is in the state corresponding to point 8 on FIG. 1. Upon application of additional dynamic or quasi-static forces, plate 16 moves in the maximum and minimum movement range depicted by line 7–8–9 in FIG. 1. Upon an increase in the payload in or the static forces on box car 14, with the application of additional dynamic or quasi-static forces, the plate 16 moves along a section of the same line, further downward and to the right. For example, with a full payload, the anticipated maximum positive and negative values, with the full range of dynamic and quasi-static forces in effect, causes plate 16 to move in the range of line 10–11–12.

The gas accumulator and back-up spring of the invention are designed for derailing safety and for an acceptable level of comfortable riding of a vehicle. Nevertheless, total anticipated spring deflection, overall spring height and stability of the vehicle all remain within tolerable limits.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A spring system comprising a combination of a main spring and an associated back-up spring:
   said main spring having first and second spaced apart sections, which said sections are movable toward one another; said main spring including elastically operating means for biasing said first and second sections apart;
   said back-up spring having a stressing surface; said back-up spring being normally prestressed; means for normally prestressing said back-up spring;
   said back-up spring stressing surface being normally spaced a first distance from said main spring first section; said back-up spring stressing surface and said main spring first section being shiftable toward one another upon application of forces to either of them and said main spring first section and said back-up spring stressing surface being so positioned that after movement of said main spring first section over said first distance relative to said stressing surface, said main spring first section engages said stressing surface, and further movement of said first main spring section in the same direction further stresses the prestressed said back-up spring.

2. The spring system of claim 1, wherein said stressing surface of said back-up spring further comprises a lateral sliding surface to cooperate with said main spring first section to enable relative lateral sliding when said main spring first section and said back-up spring stressing surface are engaged.

3. The spring system of claim 1, wherein said back-up spring is interposed between said first and said second sections of said main spring.

4. The spring system of claim 1, wherein said main spring is a fluid accumulator and the fluid is located between said spaced apart first and second sections; means for maintaining said accumulator normally pressurized and for regulating its pressure.

5. The spring system of claim 4, wherein said first and said second sections of said main spring respectively comprise a first and a second surface which cooperate in defining said fluid filled accumulator.

6. The spring system of claim 4, wherein said accumulator is a gas accumulator.

7. The spring system of claim 6, wherein said back-up spring is located inside said accumulator and is interposed between said first and said second sections of said main spring.

8. The spring system of claim 6, wherein said back-up spring is a spring formed of solid, resilient material.

9. The spring system of claim 8, wherein said back-up spring is comprised of a block of resilient material and its said stressing surface is at one end of said block.

10. A spring system of claim 4, wherein said back-up spring is comprised of a solid block of resilient material and its said stressing surface is at one end of said block.

11. A spring system of claim 4, wherein said back-up spring is located inside said accumulator and is interposed between said first and said second sections of said main spring.

12. The spring system of claim 11, wherein said accumulator is annular in shape, said back-up spring is annular in shape, and said accumulator and said back-up spring are coaxial.

13. The spring system of claim 12, wherein said first and said second sections of said main spring respectively comprise a first and a second surface which cooperate in defining said fluid filled accumulator.

14. The spring system of claim 13, wherein said stressing surface of said back-up spring further comprises a lateral sliding surface to cooperate with said main spring first surface to enable relative lateral sliding when said main spring first surface and said back-up spring stressing surface are engaged.

15. In combination, the spring system of claim 13 and means for pressing said spaced apart first and second surfaces toward one another;
   said means for maintaining and regulating pressure normally maintaining pressure in said accumulator at a level to maintain said first main spring surface and said back-up spring stressing surface apart and permitting those elements to engage upon failure of pressure in said accumulator.

16. In combination, the spring system of claim 4 and means for pressing said spaced apart first and second sections toward one another;
   said means for maintaining and regulating pressure normally maintaining pressure in said accumulator at a level to maintain said first main spring section and said back-up spring stressing surface apart and permitting those elements to engage upon failure of pressure in said accumulator.

17. A parallel spring system, comprising a combination of a main spring and an associated back-up spring:
   a main spring; a main spring support surface on which said main spring is supported; spaced from said main spring support surface are engaging means for engaging an object to be supported by said parallel spring system; said main spring extending between and normally holding apart said main spring support surface and said engaging means; said engaging means being movable toward and away from said main spring support surface thereby alternately tensioning and relaxing said main spring;

a back-up spring in parallel with said main spring; a back-up spring support surface positioned such that said main spring engaging means is movable toward and away from said back-up spring support surface; said back-up spring sitting upon said back-up spring support surface; said back-up spring having a stressing surface at the opposite end thereof from said back-up spring support surface, such that application of force to said back-up spring stressing surface stresses said back-up spring and moves its said stressing surface towards said back-up spring support surface;

said back-up spring stressing surface being normally spaced a preselected distance from said main spring engaging means, such that normal shifting of said engaging means, which results in tensioning and relaxing of said main spring, still leaves said main spring engaging means and said back-up spring stressing surface separated and also applies no stress to said back-up spring, but upon failure of said main spring to hold said main spring engaging means and said back-up spring stressing surface apart, said main spring engaging means presses upon said back-up spring stressing surface and stresses said back-up spring.

18. The parallel spring system of claim 17, wherein said main spring is a fluid accumulator and the fluid is located between said main spring engaging means and said main spring support surface; means for maintaining said accumulator normally pressurized and for regulating its pressure.

19. The parallel spring system of claim 18, wherein said accumulato is a gas accumulator.

20. The parallel spring system of claim 19, wherein said back-up spring is located inside said accumulator and is thereby positioned between said main spring engaging means and said main spring support surface.

21. The parallel spring system of claim 19, wherein said back-up spring is a spring formed of solid, resilient material.

22. The parallel spring system of claim 18, wherein said back-up spring is located inside said accumulator and is thereby positioned between said main spring engaging means and said main spring support surface;

said accumulator being annular in shape, said back-up spring being annular in shape, and said accumulator and said back-up spring being coaxial.

23. The parallel spring system of claim 17, wherein said back-up spring is normally pre-stressed; means for normally pre-stressing said back-up spring.

24. The parallel spring system of claim 23, wherein said stressing surface of said back-up spring further comprises a lateral sliding surface to cooperate with said main spring engaging means, to enable relative lateral sliding when said main spring engaging means and said back-up spring stressing surface are engaged.

* * * * *